US008913055B2

(12) United States Patent
Lim et al.

(10) Patent No.: US 8,913,055 B2
(45) Date of Patent: Dec. 16, 2014

(54) ONLINE ENVIRONMENT MAPPING

(75) Inventors: Jongwoo Lim, Sunnyvale, CA (US);
Jan-Michael Frahm, Chapel Hill, NC (US); Marc Pollefeys, Zurich (CH)

(73) Assignees: Honda Motor Co., Ltd., Tokyo (JP);
The University of North Carolina at Chapel Hill, Chapel Hill, NC (US);
ETH Zurich, Zurich (CH)

( * ) Notice: Subject to any disclaimer, the term of this patent is extended or adjusted under 35 U.S.C. 154(b) by 275 days.

(21) Appl. No.: 13/484,127

(22) Filed: May 30, 2012

(65) Prior Publication Data

US 2012/0306847 A1    Dec. 6, 2012

Related U.S. Application Data

(60) Provisional application No. 61/491,793, filed on May 31, 2011.

(51) Int. Cl.
| G06F 17/00 | (2006.01) |
| G09G 5/00 | (2006.01) |
| G06K 9/00 | (2006.01) |
| G06F 17/30 | (2006.01) |
| G06T 7/20 | (2006.01) |

(52) U.S. Cl.
CPC ........ *G06K 9/00744* (2013.01); *G06F 17/3079* (2013.01); *G06F 17/30784* (2013.01); *G06T 7/20* (2013.01)
USPC ............................ 345/418; 345/581; 382/103

(58) Field of Classification Search
CPC .. G06T 7/20; G06F 17/30784; G06F 17/3079
USPC .................... 345/418, 581; 382/103
See application file for complete search history.

(56) References Cited

U.S. PATENT DOCUMENTS

| 6,487,304 | B1 * | 11/2002 | Szeliski ................ 382/107 |
| 6,580,811 | B2 * | 6/2003 | Maurer et al. ............ 382/103 |
| 6,952,212 | B2 * | 10/2005 | Nister et al. ............ 345/474 |
| 7,015,831 | B2 | 3/2006 | Karlsson et al. |
| 7,689,321 | B2 | 3/2010 | Karlsson |
| 7,714,895 | B2 | 5/2010 | Pretlove et al. |
| 7,831,433 | B1 * | 11/2010 | Belvin et al. ............ 704/275 |

(Continued)

OTHER PUBLICATIONS

Konolige et al; View-based Maps; Jun. 2009; Proceedings of Robotics: Science and Systems V.*

(Continued)

*Primary Examiner* — David T Welch

(74) *Attorney, Agent, or Firm* — Fenwick & West LLP; Mark E. Duell

(57) ABSTRACT

A system and method are disclosed for online mapping of large-scale environments using a hybrid representation of a metric Euclidean environment map and a topological map. The system includes a scene module, a location recognition module, a local adjustment module and a global adjustment module. The scene flow module is for detecting and tracking video features of the frames of an input video sequence. The scene flow module is also configured to identify multiple keyframes of the input video sequence and add the identified keyframes into an initial environment map of the input video sequence. The location recognition module is for detecting loop closures in the environment map. The local adjustment module enforces local metric properties of the keyframes in the environment map, and the global adjustment module is for optimizing the entire environment map subject to global metric properties of the keyframes in the keyframe pose graph.

18 Claims, 6 Drawing Sheets

(56) References Cited

U.S. PATENT DOCUMENTS

| | | | |
|---|---|---|---|
| 2004/0167670 A1 | 8/2004 | Goncalves et al. | |
| 2005/0025343 A1 | 2/2005 | Zhang et al. | |
| 2006/0088203 A1 | 4/2006 | Boca et al. | |
| 2006/0288288 A1* | 12/2006 | Girgensohn et al. | 715/716 |
| 2007/0030396 A1* | 2/2007 | Zhou et al. | 348/700 |
| 2007/0115352 A1 | 5/2007 | Oskiper et al. | |
| 2009/0010507 A1* | 1/2009 | Geng | 382/128 |
| 2010/0232727 A1 | 9/2010 | Engedal | |
| 2010/0268697 A1 | 10/2010 | Karlsson et al. | |
| 2012/0121161 A1* | 5/2012 | Eade et al. | 382/153 |
| 2012/0300979 A1* | 11/2012 | Pirchheim et al. | 382/103 |

OTHER PUBLICATIONS

Klein et al; Parallel Tracking and Mapping for Small AR Workspaces; Nov. 2007; University of Oxford.*

Blanco, J.L., et al., "Toward a Unified Bayesian Approach to Hybrid Metric—Topological SLAM," IEEE Transactions on Robotics, vol. 24, No. 2, pp. 259-270, Apr. 2008.

Holmes, S., et al., "A Relative Frame Representation for Fixed-Time bundle Adjustment in SFM, IEEE International Conference on Robotics and Automation," Kobe International Conference Center, Kobe, Japan, May 12-17, 2009, pp. 2264-2269.

Konolige, K., et al., "FrameSLAM: From Bundle Adjustment to Real-Time Visual Mapping," IEEE Transactions on Robotics, vol. 24, No. 5, pp. 1066-1077, Oct. 2008.

Ni, K., et al., "Multi-Level Submap Based SLAM Using Nested Dissection," The 2010 IEEE/RSJ International Conference on Intelligent Robots and Systems, Taipei, Taiwan, Oct. 18-22, 2010, pp. 2558-2565.

Patent Cooperation Treaty, International Search Report and Written Opinion, International Patent Application No. PCT/US2012/040028, Aug. 16, 2012, 14 Pages.

* cited by examiner

ONLINE ENVIRONMENT MAPPING

CROSS-REFERENCE TO RELATED APPLICATION

This application claims priority from U.S. Patent Application No. 61/491,793, entitled "Online Environment Mapping," filed on May 31, 2011, which is hereby incorporated by reference in its entirety.

FIELD OF THE INVENTION

The invention relates generally to vision-based mapping and in particular to real-time metric map reconstruction of the environment visited by a navigation device using a hybrid representation of a fully metric Euclidean environment map and a topological map.

BACKGROUND

The recent progress of robotics and computing hardware have increased the demand for online metric map reconstruction from cameras. At the same time the scale of metric maps has been increased by two to three orders of magnitude. This poses a significant challenge for current state of the art camera based large scale modeling approaches. One of the most demanding applications of vision based map reconstruction is in robotics. Robots inherently need to model surround environment to safely navigate in a space while performing the various tasks.

Traditionally laser range finders (LIDAR) have been used in this task mainly because they directly measure the distance to a surface of a space visited by a robot with high precision. However there are significant limitations in this type of sensors. The major limitation is that typical LIDAR sensors only scan a 2D slice of the space and the slice needs to be in the same plane for an online simultaneous localization and mapping (SLAM) system to work. This limits the use of laser-based SLAM systems in an environment having objects with complex height profile (such as tables or shelves) for a robot to move freely in a 3D space. Moreover LIDAR sensors require highly accurate tracking on mobile platforms when moving. Another issue with the sensor is its size, weight and power consumption, which are significantly larger than passive sensors like video cameras.

In SLAM systems, the most difficult problem is to maintain an environment map (i.e., the perceived model of the environment) consistent to all observations, especially when loops exist in the motion trajectory of a robot. Existing SLAM solutions to the problem use bundle adjustment, which scales cubically with the problem size, thus prohibiting online computation in large scale environments. Bundle adjustment parameterizes structure from motion as an optimization problem, which characterizes each camera with six degrees of freedom (DOF) for the translation and rotation of the camera and plus parameters for the camera calibration and radial distortion. Additionally, the 3D points are parameterized through their three position parameters. The projection equations are used to derive a non-linear set of equations which are linearized through a Taylor series and solved efficiently through a sparse solver.

Large scale reconstructions of environment maps are challenging since the complexity of the bundle adjustment is at least cubic in the number of cameras plus a linear complexity in the number of points. Topological mapping can be used for online computation in large scale environments. Topological mapping represents the environment as a graph with a set of places (nodes) and the relative location information between the places (edges). In this representation, a loop closure does not require any additional error adjustment. However, in return, it loses the global metric property. For example, a robot cannot perform spatial reasoning for proximity unless the link between the map locations is present in the topological map.

Figure 1:
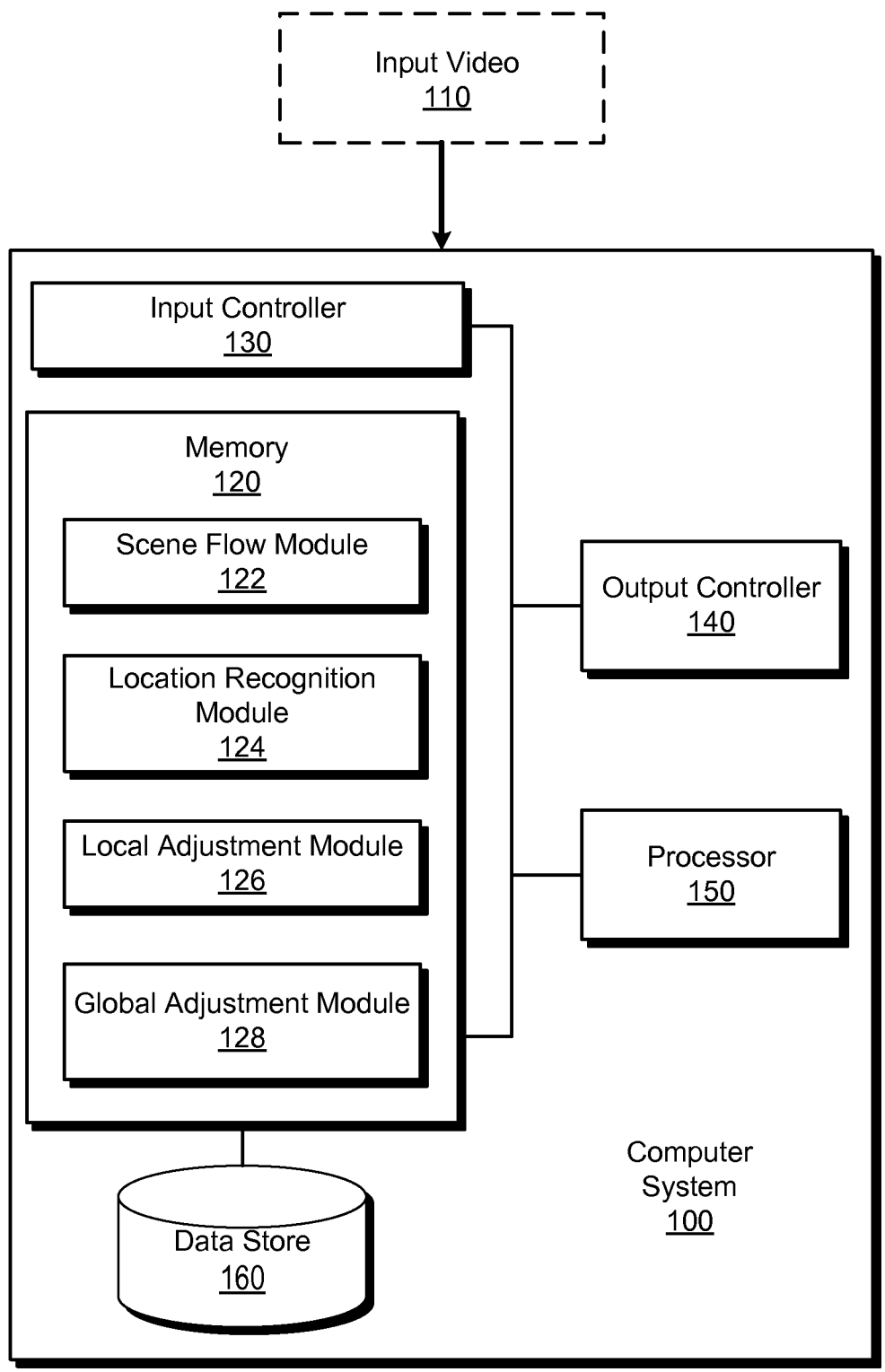
FIG. 1 illustrates a computer system for online environment mapping according to one embodiment of the invention.

The figures depict various embodiments of the invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

An embodiment of the invention is now described with reference to the figures where like reference numbers indicate identical or functionally similar elements.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the invention include process steps and instructions described herein in the form of an algorithm. It should be noted that the process steps and instructions of the invention could be embodied in software, firmware or hardware, and when embodied in software, could be downloaded to reside on and be operated from different platforms used by a variety of operating systems.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the invention is not described with reference to any particular programming language. It will be appreciated that a variety of programming languages may be used to implement the teachings of the invention as described herein, and any references below to specific languages are provided for disclosure of enablement and best mode of the invention.

In addition, the language used in the specification has been principally selected for readability and instructional purposes, and may not have been selected to delineate or circumscribe the inventive subject matter. Accordingly, the disclosure of the invention is intended to be illustrative, but not limiting, of the scope of the invention, which is set forth in the claims.

Embodiments of the invention provide a solution to the online mapping of large-scale environments using a hybrid representation of a metric Euclidean environment map and a topological map. One embodiment of a disclosed system includes a scene flow module, a location recognition module, a local adjustment module and a global adjustment module. The scene flow module is for detecting and tracking video features of the frames of an input video sequence. The scene flow module is also configured to identify multiple keyframes of the input video sequence and add the identified keyframes into an initial environment map of the input video sequence. The environment map is represented by a keyframe pose graph comprising the keyframes as the nodes of the graph and neighboring keyframes are connected by edges in the graph. The location recognition module is for detecting loop closures in the environment map. The local adjustment module enforces local metric properties of the keyframes in the environment map, and the global adjustment module is for optimizing the entire environment map subject to global metric properties of the keyframes in the keyframe pose graph.

System Overview

A solution to the online mapping of large-scale environments described above is an improved SLAM system that uses a hybrid representation of a metric Euclidean environment map and a topological map. The system models inter-sub-map relationships of the online mapping through topological transformations by effectively summarizing the mapping constraints into the transformation. The system provides a more compact representation of the boundary variables, leading to a computationally more efficient solution of the global problem of online environment mapping.

Additionally, the system reduces the number of cameras by selecting keyframes and using segments of keyframes of an input video stream via global adjustment. The system encodes the constraints between sub-maps through the topological transformations between the sub-maps. Comparing with existing methods (e.g., FrameSLAM method), the system does not depend on the linearization of the projection function to create the marginalized constraints, and does not suffer under the inaccuracy in the linearization.

The improved SLAM system achieves a globally metric solution while maintaining the efficiency during the processing of the sub-maps by optimizing the constraints of adjacent sub-maps through iterative optimization of the non-linear constraints. The adjacent sub-maps have a topological transformation defined in between them.

Turning now to FIG. 1, FIG. 1 illustrates a computer system 100 that implements an improved SLAM system according to one embodiment of the invention. The computer system 100 deploys a hybrid mapping method by combining the benefits of metric Euclidean maps and topological maps, namely the locally-metric globally topological mapping, to generate the environment map of an input video stream. The environment map is represented as a graph of the keyframes (nodes) of the input video stream and the relative pose between keyframes (edges), like the topological approach. The main distinction to existing approaches is that the computer system 100 enforces the metric properties by enforcing the locally metric property all the time via local adjustment, and global "metricness" via a decoupled parallel global bundle adjustment module.

In one embodiment, the computer system 100 comprises a memory 120, an input controller 130, an output controller 140, a processor 150 and a data store 160. The computer system 100 is configured to receive an input video 110 for building up a map of the environment contained in the input video 110. For simplicity of description of one embodiment, the map of the environment contained in the input video 110 is referred to as "environment map of the input video" from herein. The environment map can be used to determine a location within the environment and to depict the environment for planning and navigation by robots and/or autonomous vehicles.

The input video 110 comprises multiple video frames with various motion characteristics. In one embodiment, the input videos 110 are captured by two stereo rigs, one of which with 7.5 cm baseline and 110° horizontal field of view is mounted in the head of a humanoid robot. The second stereo rig has a baseline of 16 cm and a 95° horizontal field of view and is mounted at the front of an electric cart. The effective image resolution after rectification is 640×360 pixels. The input videos are recorded at 12~45 frame per second (fps).

An example input video 110 is a video sequence taken by a humanoid robot walking in a large building. There is a corridor with very few features in which case the motion estimation becomes inaccurate. Due to the robot's motion characteristics, the camera experiences shaking and vibrations. The proposed online environment mapping demonstrates the efficiency of feature tracking and accuracy of global geometry of the mapping performed by the computer system 100.

Another two example input videos 110 are an indoor video sequence and an outdoor video sequence taken from a moving electric cart. The cart-outdoor sequence contains a very long travel around a building, and the accumulated motion estimation error is corrected when loops are detected. The cart-indoor sequence has a depth range of the tracked features ranging from very close to far, and contains a significant number of loops. The proposed solution shows that it keeps the local geometry in the map to be metric and correct, whereas the global metric property is improved as global adjustment progresses.

The memory 120 stores data and/or instructions that may be executed by the processor 150. The instructions may comprise computer program code for performing any and/or all of the techniques described herein. The memory 120 may be a DRAM device, a static random access memory (SRAM), Flash RAM (non-volatile storage), combinations of the above, or some other memory device known in the art. In one embodiment, the memory 120 comprises a scene flow module 122, a location recognition module 124, a local adjustment module 126 and a global adjustment module 128. Other embodiments may contain different functional modules and different number of modules.

The scene flow module 122 is configured to detect and extract spatio-temporal salient features of the input video 110. Salient features of a video sequence can localize the motion events of the video sequence. The scene flow module 122 is further configured to find inlier features among the tracked features and initial three-dimensional (3D) camera pose. Inlier features of the input video 110 are the features whose distribution can be modeled by some set of model parameters used to track the salient features of the input video 110. The scene flow module 122 is further configured to create keyframes based on the optimized inlier features and generate an initial environment map represented by a keyframe pose graph. The keyframe pose graph is described in details below.

The location recognition module 124 is configured to find possible loop closures in the environment map. A loop closure occurs when the computer system 100 revisits a previously-captured location. In one embodiment, the location recognition module 124 uses feature descriptors computed on the tracked feature points to find the loop closures. Candidate keyframes of the input video 110 are selected based on the feature descriptors, where a candidate keyframe with the number of inliers above a given threshold value is chosen as the location recognition result and is added to the keyframe pose graph.

The local adjustment module 126 is configured to perform a windowed bundle adjustment of the recently added keyframes of the input video 110. The global adjustment module 128 is configured to optimize the keyframe pose graph and generate an optimized environment map of the input video 110. The local adjustment and global optimization processes are further described below.

Figure 2:
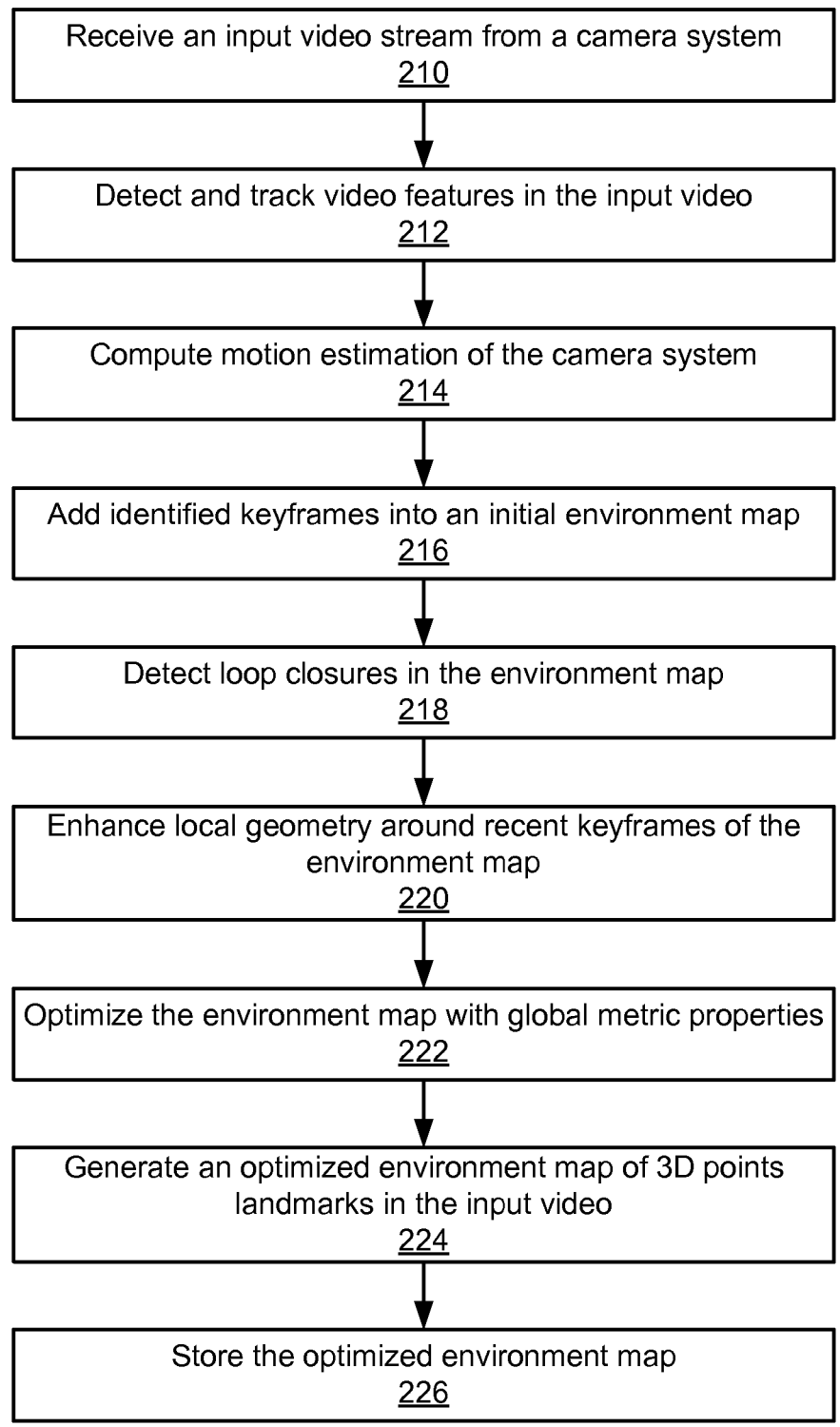
FIG. 2 is a system level flowchart of generating a map of the environment contained in an input video stream in real-time according to one embodiment of the invention.

FIG. 2 is a system level flowchart of generating a map of the environment of an input video stream in real-time according to one embodiment of the invention. Initially, the computer system 100 receives 210 an input video from a camera system and detects and tracks 212 the video features (e.g., the salient motion events) in the input video. The computer system 100 computes 214 the motion estimation of the camera system (e.g., the initial 3D camera pose) and adds 216 identified keyframes of the input video into an initial environment map represented by a keyframe pose graph. The computer system 100 detects 218 the loop closures in the environment map and enhances 220 the local geometry around recently added keyframes of the environment map. The computer system 100 further optimizes 222 the environment map with global metric properties and generates 224 an optimized environment map of 3D points and landmarks detected in the input video. The computer system 100 stores 226 the optimized environment map for various online environment mapping applications.

Keyframe Pose Graph

In one embodiment, the environment map is represented as a keyframe pose graph, whose nodes of the graph are the keyframes of an input video and edges represent the relative pose between two keyframes. More precisely, an edge a→b: $P_{ab}$ represents a link from node a to node b with the associated 3D Euclidean transformation $P_{ab}$, where $P_{ab}$ is a 4×4 camera projection matrix with six 3D pose parameters, and the camera projection matrix is inverse of the camera motion matrix. The pose graph is an undirected graph and if the edge a→b: $P_{ab}$ is in the graph, b→a:$P_{ab}=P_{ab}^{-1}$ is also in the graph. It is noted that there is no coordinate system in the representation of keyframe pose graph.

Figure 3:
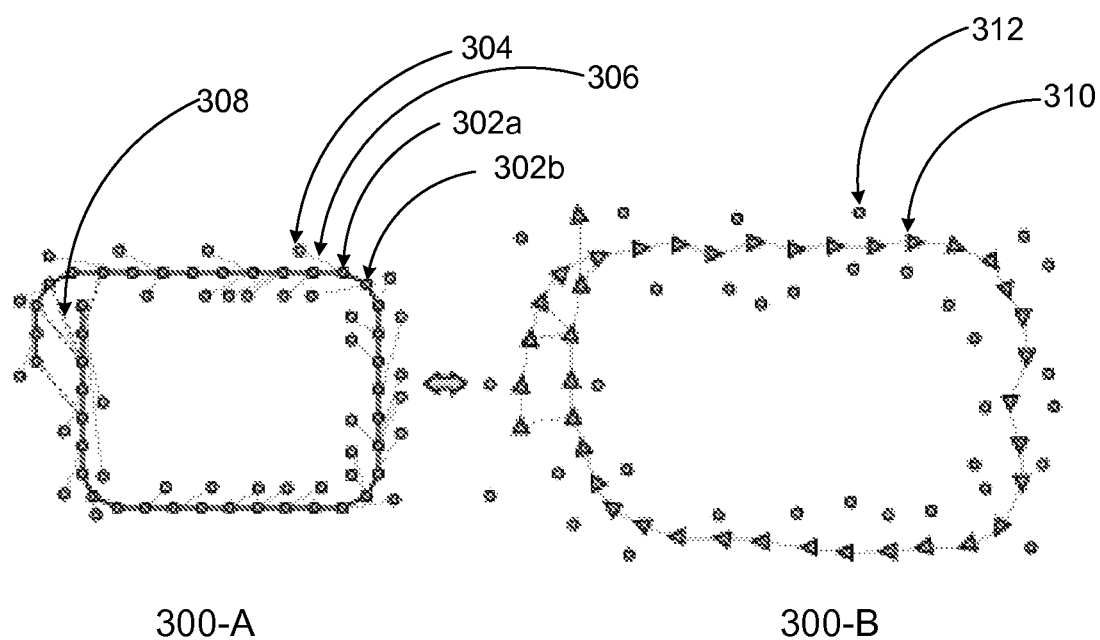
FIG. 3 illustrates examples of a keyframe pose graph of the environment contained in an input video stream and its corresponding environment map embedding of the keyframes with associated landmarks according to one embodiment of the invention.

An example keyframe pose graph is shown in FIG. 3. The keyframe pose graph 300-A shows the topological structure of an example environment of an input video. The keyframe pose graph shown in 300-A includes multiple keyframes (e.g., keyframe 302a and keyframe 302b) and landmarks associated with the keyframes (e.g., landmark 304 associated with the keyframe 302a). The keyframes are connected (e.g., the link between the keyframes 302a and 302b). A landmark is associated with one or more keyframes (e.g., landmark 304 associated with keyframe 302a) and the association is represented by a link between the landmark and each of the associated keyframes (e.g., the link 306 between the landmark 304 and keyframe 302a).

The environment map is incrementally constructed as the camera moves to capture the input video sequence. Most keyframes are linked to the previous keyframes via commonly observed landmarks (e.g., the link between keyframes 302a and 302b). When a robot visits previously seen places, the location recognition module 124 finds additional links between keyframes, which create loops in the keyframe pose graph (e.g., the dashed line 308 shown in FIG. 300-A). The landmarks are attached to an anchor keyframe, where the landmarks are first observed (e.g., the link 306 between the landmark 304 and the keyframe 302a). In one embodiment, an anchor keyframe for a landmark is selected randomly from the keyframes that observed the landmark. Each landmark's position in the environment map is represented as a homogeneous 4-vector x in the anchor keyframe's coordinate system.

To generate an optimized environment map, the metric property of the environment map is embedded into the keyframe pose graph. In one embodiment, the metric embedding of the keyframe pose graph is constructed as follows in Table I:

TABLE I

Pseudo Code for Metric Embedding of a Keyframe Pose Graph

For a given reference keyframe $a_0$:
Step 1: put the keyframe $a_0$ at the origin ($\hat{P}_{a0} = I_{4\times4}$), and push $(0, a_0)$ into a priority queue pq;
Step 2: {
  pop (d,a) with the smallest d from pq
  for each neighbor keyframe b of a, a → b : $P_{ab}$ {
    if b is not in the embedding {
      add the keyframe b with the pose $\hat{P}_b = P_{ab}\hat{P}_a$;
      put $(d + |P_{ab}|_G, b)$ into pq .
    }
  }
}
Step 3: for each landmark l and its anchor keyframe $c_l$ {
  add the landmark l at the location $\hat{x}_l = P_{cl}^{-1} x_l$.
}

$\hat{P}_a$ denotes the pose of a keyframe a in the embedded space. $|P|_G$ denotes the norm of the translation component in P, and d in (d, a) is the geodesic distance from $a_0$ to a on the keyframe pose graph. The geodesic distance from $a_0$ to a on the keyframe pose graph represents the number of edges between $a_0$ to a on the keyframe pose graph in a shortest path connecting them.

Conceptually, the metric embedding procedure illustrated above performs weighted breadth first search of the keyframe pose graph from a reference keyframe and embeds the keyframes according to the order of the breadth first search. The landmarks are embedded using their anchor keyframes' embedded pose. FIG. 300-B shows an example of the embedded keyframe pose graph corresponding to the keyframe pose graph in FIG. 300-A, where 310 is an example of a metric embedded keyframe and 312 is a landmark. It is noted that the embedded maps of a keyframe pose graph may be different depending on the choice of the reference keyframes, and there is no guarantee that a loop in an initial map represented by the keyframe pose graph remains as a valid loop in the embedded map. If there is metric inconsistency in a loop (e.g., when the combined transformation along a loop is not an identity transformation), the accumulated error will break the farthest link from the reference keyframe.

Compared to the existing bundle adjustment methods, the proposed computer system 100 improves the artifact in topological mapping by enforcing the metric property through local and global adjustment. The hybrid approach implemented by the computer system 100 is able to maintain the benefit of topological map (e.g., instant loop closure), whereas the map is enforced to be metrically correct after local and global adjustment.

Local Adjustment

A new keyframe is selected if it provides the majority of changes in the environment map with its nearby keyframes that have commonly visible landmarks. In one embodiment, the change is computed through the local adjustment module 126, which improves the estimated motion of a current keyframe, and ensures a locally metric map around the current keyframe's location. When a new keyframe is added to the keyframe pose graph, the estimated pose of the keyframe may contain small error because it is computed and optimized using the landmarks associated with the keyframe, and the landmarks are themselves fixed in position. In the case of a detected loop, the local and global metric constraint may additionally be violated by the newly added link. To ensure that the camera pose estimation and location recognition in the next keyframes will work properly, the local adjustment module 126 is configured to resolve the observed inconsistencies in time, at least locally.

In one embodiment, the local adjustment module 126 updates the links to active keyframes and the positions of active landmarks. The most recent-w keyframes are initially selected as the active keyframes, where w is a window size parameter, typically 5~10. If there are links between one or more additional keyframes and the initial active keyframes, the additional keyframes are also added to the active keyframe set. In one embodiment, the size of the active keyframe set is bounded because the number of active keyframes is at most twice the window size w due to the fact that the location recognition adds no more than one additional link per keyframe. Next, all landmarks visible from the active keyframes are used in the optimization as the active landmarks. All other keyframes which have the observations of the active landmarks are included as fixed keyframes that can use all available observations of the landmarks in the local adjustment. All anchor keyframes for the active landmarks are part of the embedding from the map construction.

Table II illustrates one embodiment of local adjustment for the new keyframes.

TABLE II

Pseudo Code for Keyframes Local Adjustment

Step 1: find the active keyframes $\{a_j\}$, and determine active landmarks $\{l_i\}$ and fixed keyframes $\{a_{k'}\}$;
Step 2: embed $\{a_j\}$ $\{l_i\}$ $\{a_{k'}\}$ into $\{\hat{P}_{aj}\}$ $\{\hat{x}_{ij}\}$ $\{\hat{P}_{a'k}\}$ in a local metric space centered at the most recent keyframe $a_0 \in \{a_j\}$;
Step 3: run a sparse bundle adjustment algorithm in the local metric space;
Step 4: update the map using adjusted keyframe poses $\{\tilde{P}_{aj}\}$ and landmark positions $\{\tilde{x}_{lj}\}$:
  - any existing a → b, a ∈ $\{a_j\}$, set a → b : $\tilde{P}_b\tilde{P}_a^{-1}$.
  - any existing b → a, a ∈ $\{a_j\}$, set b → a : $\tilde{P}_b\tilde{P}_a^{-1}$.
  - any l ∈ $\{l_i\}$ with its anchor keyframe $c_l$, $x_l = \tilde{P}_{ci}\tilde{x}_l$.

In one embodiment, the local adjustment module 126 uses a standard sparse bundle adjustment algorithm in the embedded metric space for optimization. After applying the Schur complement for local adjustment optimization, the largest linear system to be solved by the local adjustment module 126 has at most 12×w variables, where w is a window size parameter. The number of landmarks and fixed keyframes affects the performance through the increased number of observations, but in a usual setup, the local adjustment runs efficiently. Once the keyframes and landmarks are embedded in a metric space, the explicit topological structure is not used anymore, but it still remains in the observations that associate keyframes and landmarks. In one embodiment of sparse bundle adjustment, the same topological structure is used implicitly through the Jacobian matrices for keyframes and landmarks. After sparse bundle adjustment, the optimized keyframes and landmarks are imported back into the environment map represented by the keyframe pose graph with local adjustment.

Figures 4A, 4B:
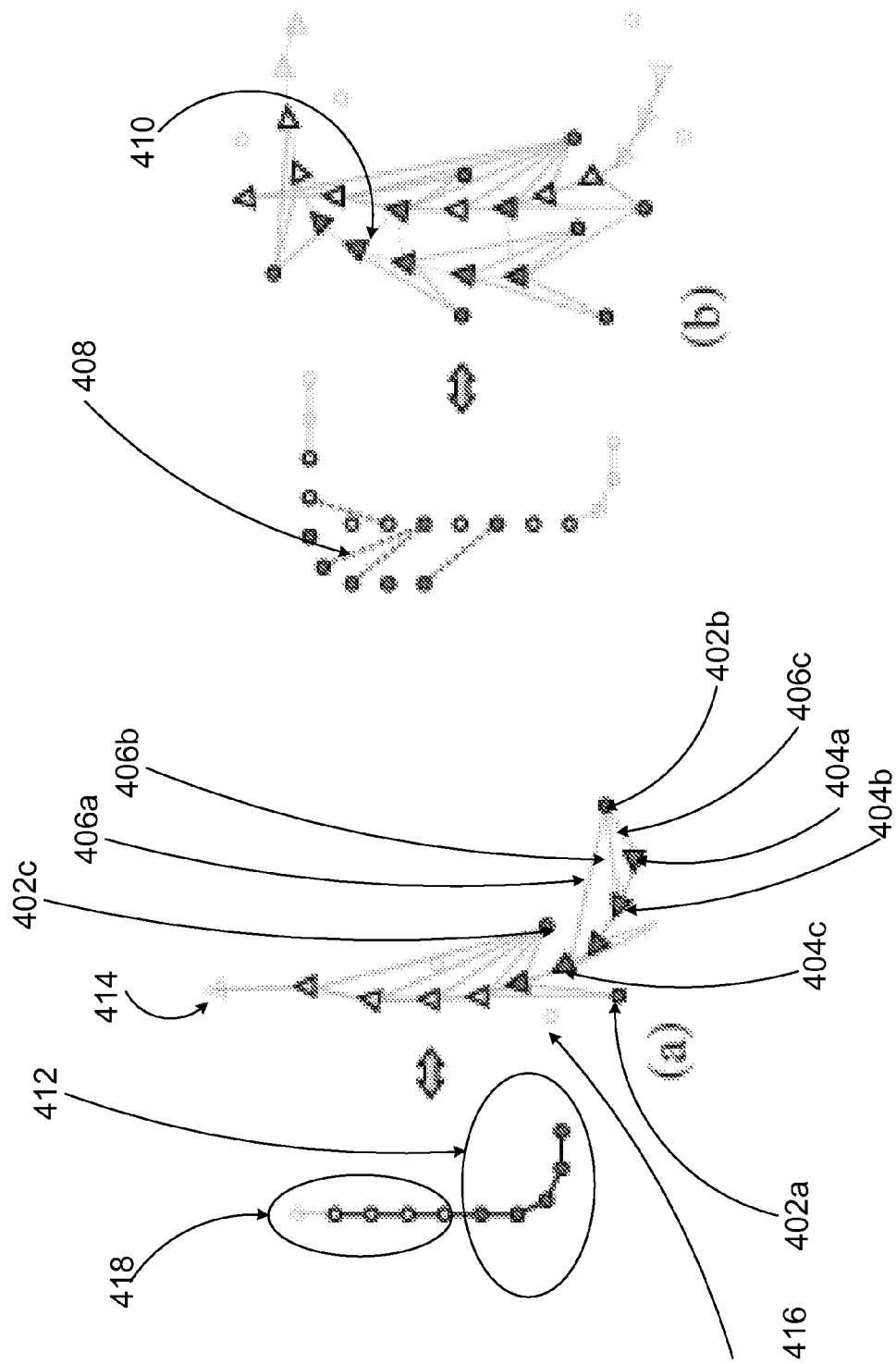
FIG. 4A illustrates an example of a keyframe pose graph with local adjustment according to one embodiment of the invention.
FIG. 4B illustrates an example of a keyframe pose graph with detected loop closures and local adjustment to the keyframe pose graph according to one embodiment of the invention.

FIG. 4A illustrates an example of keyframe pose graphs with local adjustment according to one embodiment of the invention. The left part of FIG. 4A shows a keyframe pose graph having a window 412 of 5 active keyframes and 5 fixed keyframes (418) of an initial environment map without local adjustment. The fixed keyframes are keyframes outside the current processing window but with observations of the active landmarks. The fixed keyframes can use all available observations of landmarks in the local adjustment.

The local adjustment module 126 performs a sparse bundle adjustment algorithm on the initial environment map to enforce metric constraints locally. The right side of FIG. 4A shows the environment map with local adjustment, which updates the links to the active keyframes and the positions of the active landmarks. For example, 402a, 402b and 402c are active landmarks observed by the active keyframes of the current processing window. The active landmark 402b is observed by keyframes 404a, 404b and 404c. The association between the active landmark 402b and the keyframes 404a, 404b and 404c are represented by the links 406a, 406b and 406c. Some keyframes and the landmarks (e.g., keyframe 414 and landmark 416) are not used in the local optimization. Similarly, FIG. 4B illustrates an example of a keyframe pose graph with detected loop closures (e.g., loop 408) and its corresponding keyframe pose graph with local adjustment.

Compared with existing local adjustment methods, one important improvement of the proposed solution is that the local metric constraints are guaranteed since all entities (e.g., active keyframes and landmarks) are embedded in a metric space. Moreover, the local adjustment module 126 has no need to propagate Jacobian matrices over the edges of the keyframe pose graph, making it more computationally efficient. Additionally, proposed solution is conceptually simpler because it can fully operate in a conventional metric space where all known bundle adjustment methods can be used.

Global Adjustment

The local adjustment described above guarantees that the environment map is locally metric, but still the entire map may not be metric due to the errors along the detected loop closures. Achieving global metric consistency (i.e., the relative rotation and translation among multiple observations of a scene) is in general not simple in topological maps. One solution is to embed the entire map into the metric space, optimize the embedded structure, and update the result back into the topological map. This is fundamentally identical to the local adjustment step described above, but when a large number of keyframes and landmarks exist, this may take significant computation time and may have difficulty in converging to the right map.

In one embodiment, the global adjustment module 128 is configured to use a novel divide-and-conquer strategy to efficiently solve the global adjustment problem. First, the global adjustment module 128 clusters the keyframes into multiple disjoint sets. A disjoint set of keyframes is a segment which uses geodesic distance on the keyframe pose graph. The global adjustment module 128 iterates local segment-wise optimization and global segment optimization as follows:

TABLE III

Pseudo Code for Keyframes Global Adjustment

Step 1: group the keyframes into k segments $s_k = \{a_j^{(k)}\}$;
Step 2: for each segment $s_j$, run local adjustment if necessary;
Step 3: run global segment optimization:
    - embed all segments $\{s_k\}$ into a metric space, $\{\hat{Q}_{s_k}\}$;
    - embed all landmarks $\{l_i\}$ into the same space, $\{\hat{x}_{l_i}\}$;
    - optimize $\{\hat{Q}_{s_k}\}$ and $\hat{x}_{l_i}$ into $\{\hat{Q}_{s_k}\}$ and $\{\hat{x}_{l_i}\}$;
    - update the map using $\{\hat{Q}_{s_k}\}$ and $\{\hat{x}_{l_i}\}$.

In global segment optimization, segments are treated as rigid bodies in embedding and optimization in Step 3. $\{\hat{Q}_s\}$ denotes a segment-wise six degree of freedom 3D rigid motion, and the projected coordinate of landmark/to keyframe j in segment k is $$p(\hat{x}_l, \hat{P}_j, \hat{Q}_k) = K\hat{P}_j\hat{Q}_k\hat{x}_l,  \quad (1)$$

where K is the 3×4 camera projection matrix, and $\hat{P}_j$ is only updated in Step 2 and kept constant in Step 3.

Since each segment moves as a rigid body, the number of variables in the linear system after Schur complement is 6×k. The main idea is to make the global segment adjustment faster by reducing the number of variables, and more stable by grouping nearby keyframes together. As discussed above, in the embedded space the inconsistency along a loop is concentrated at the farthest link from the reference keyframe, thus, there may be a large opening or overlap at the link. If individual keyframes are used with sparse bundle adjustment for global adjustment, it is likely that the keyframes around this link may not converge to the right pose. If a group of keyframes is restricted to move rigidly, the contribution of each observation is accumulated to the segment instead of the individual keyframe, and it is more likely to find the correct pose, although it may not be as accurate as optimizing individual keyframes. The small errors that may be caused by rigid segment treatment will be reduced by the segment-wise optimization in the next iteration.

The proposed global adjustment has several advantages over existing methods. For example, using existing nested dissection with boundary variables has a serious problem of most of variables being boundary when the graph is not very sparse and segmentation is fine. Long tracks of features induce dependencies among all keyframes that observe common landmarks, and the sparsity is significantly reduced. The proposed solution does not have this issue since it treats each segment as a virtual camera, so the size of global optimization does not depend on the sparsity of the environment map.

Figure 5:
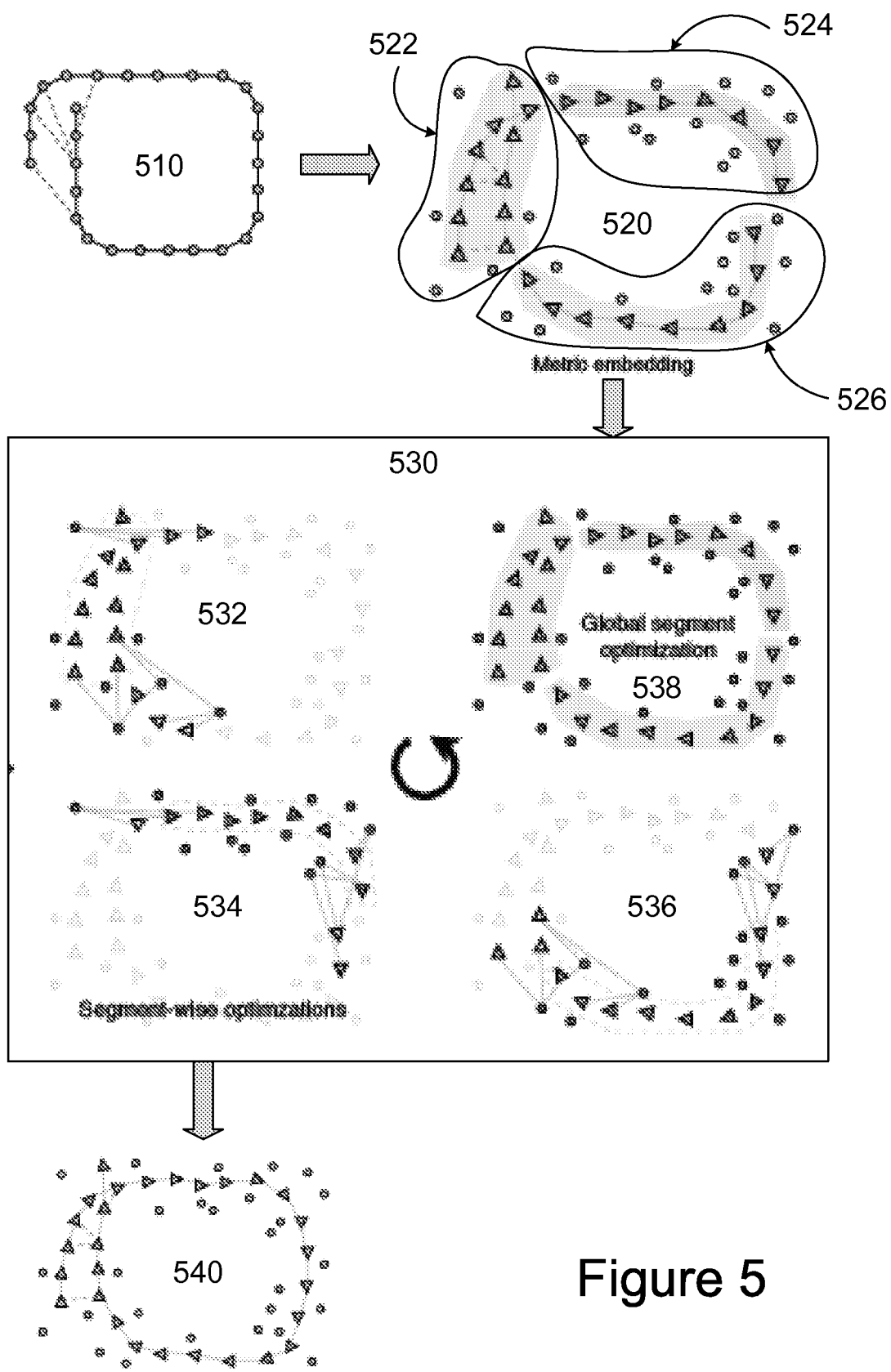
FIG. 5 is an example of global adjustment procedure of an environment map according to one embodiment of the invention.

FIG. 5 is an example of global adjustment procedure of an environment map according to one embodiment of the invention. The keyframe pose graph 510 is partitioned into 3 keyframes segments, 522, 524 and 526 and the segments are embedded into a metric space 520. Each segment of keyframes is optimized by a local adjustment algorithm if necessary. The global adjustment module 128 adjusts the segments' poses and landmarks' positions assuming that the segments are moving rigidly. For example, segment 522 is adjusted within the segment (e.g., segment adjustment 532). Similarly, segment 524 and segment 526 are adjusted within their respective segments (e.g., segment adjustment 534 and segment adjustment 536). The lines in each segment adjustment show the association of the landmark and keyframes that commonly observe the landmark. After an iteration of global adjustment 538, the result keyframe poses and landmark positions are updated back in to the keyframe pose graph and global adjustment module 128 generates an update environment map represented by the globally adjusted keyframe pose graph 540.

An Example Online Environment Map Generation System

Figure 6:
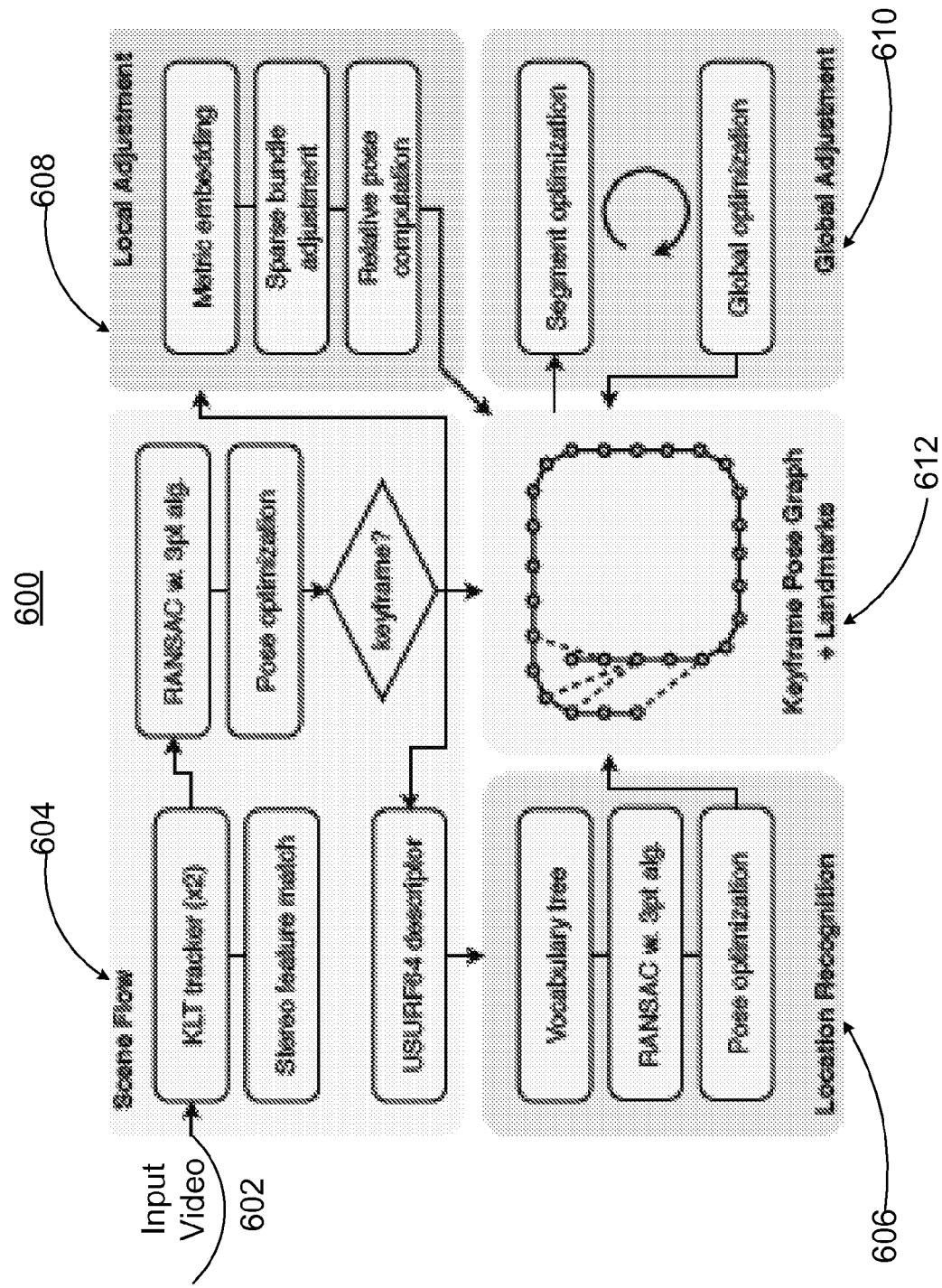
FIG. 6 is an example computer system for online environment mapping using a hybrid representation of a metric Euclidean environment map and a topological map according to one embodiment of the invention.

FIG. 6 is an example computer system 600 for online environment mapping using a hybrid representation of a metric Euclidean environment map and a topological map on a robot platform according to one embodiment of the invention. The system 600 takes an input video 602 and generates an environment map of sparse 3D point landmarks 612 contained in the input video 602. In one embodiment, the input video 602 is a calibrated stereo video stream captured by a camera system with a pair of stereo cameras. The system 600 has four major components: scene flow module 604, location recognition module 606, local adjustment module 608 and global adjustment module 610. All four components 602, 604, 606 and 608 are executed in parallel to minimize latency and to maximize performance throughput. Processing parameters, such as video frame feature descriptors and keyframe identifications are propagated between modules using standard message passing mechanisms (e.g., remote procedure calls).

The scene flow module 602 is responsible for detecting and tracking salient features in the input video stream 602, finding inlier features among the tracked features and computing the initial six-degree of freedom motion estimates of the camera system. The six-degree of freedom motion estimates of the camera system constitute the pose estimates of the camera system. The scene flow module 604 processes each video frame of the input video 602 by detecting and tracking salient features in the video frame, finding inlier features among the tracked features and computing the motion estimates of the camera system with respect to the video frame being processed. By processing each video frame, the robot has the pose estimates of the camera system at all times during the environment map generation.

In the embodiment illustrated in FIG. 6, the scene flow module 604 uses a corner detector that is limited to detection on edges for feature detection step. Using the corner detector ensures the feature placement to be on the true corners in the scene. The scene flow module 604 tracks the detected features by two 2D Kanade-Lucas-Tomasi (KLT) feature trackers on the left and right camera's video streams separately. Stereo correspondences of the features are established using normalized sum of squared differences (SSD) of the initially detected features. The scene flow module 604 constantly checks the detected features to determine whether the detected features are on the epipolar line with valid disparity during tracking.

The scene flow module 604 computes the initial 3D position of a landmark using the disparity from the stereo feature match (e.g., distances among observed key points of the stereo feature). As the camera moves, the local adjustment module 608 and the global adjustment module 610 update the landmark position using all available observations from different viewpoints of a scene.

Some of the tracked features may be drifted or may be from independently moving objects. The scene flow module 604 employ a 3-point algorithm embedded in a random sample consensus (RANSAC) procedure for robust motion estimation and outlier rejection. Once RANSAC finds the initial 3D camera pose and inlier features, the 3D pose is enhanced with a non-linear optimization using all inlier features, and a new set of inliers is found with the enhanced pose estimate.

If there is enough camera motion or change in features, a keyframe is created and added to the map by the scene flow module 604. The new keyframe is passed to the location recognition module 606 and the local adjustment module 608 for further processing. Newly established features are added as new landmarks, and the landmarks with too few observations are later removed from the environment map when they are lost in tracking.

The location recognition module 606 is responsible for finding possible loop closures in the environment map. A loop closure is detected if the system 600 is revisiting a previously-captured location. In one embodiment, the location recognition uses an upright version of speeded-up robust features (USURF-64) descriptors computed on the tracked feature points for location recognition. This is possible because the scale of each feature can be computed from the inverse of the depth of the feature. The advantages are increased performance by saving the interest point detection and better stability in determining the feature's scale. The descriptors are computed using integral image techniques and the descriptors are attached to the landmark observation.

The location recognition module 606 selects candidate keyframes using a vocabulary tree on the USURF-64 descriptor (width=40, depth=3). In one embodiment the vocabulary tress is trained off-line from millions descriptors from various indoor and outdoor training videos. For each candidate, the location recognition module 606 performs the relative pose estimation using RANSAC with the 3-point algorithm similarly by the scene flow module 604, and the candidate with most inliers (e.g., above a given threshold) is chosen as the location recognition result. The obtained pose estimate and the inlier set are improved via a non-linear optimization. If a match is successfully found, a new link connecting the current keyframe to the detected keyframe is added into the keyframe pose graph 612. This link is optimized by both the local adjustment module 608 and the global adjustment module 610.

The local adjustment module 608 performs a windowed bundle adjustment of the recently added keyframes as described above in the Section "Local Adjustment." In one embodiment, the local adjustment module 608 uses the standard sparse bundle adjustment algorithm with pseudo Huber norm to perform local adjustment.

The global adjustment module performs the optimization of the entire environment map as described above in the Section "Global Adjustment." The keyframes, which are currently considered in the local adjustment's windowed bundle adjustment, are excluded from the global adjustment to avoid inconsistencies by updating the same link in different modules. Segment-wise optimization is performed in the same or similar way as the local adjustment with all keyframes in the segment as active keyframes. For global segment optimization, the global adjustment computes a Jacobian matrix for segment-wise motion using Equation (1), and the rest of the global adjustment is similar to the local adjustment.

To make global adjustment use as many keyframes as possible, in one embodiment, the global optimization iterates only once and new segmentation is found using all available keyframes including newly added keyframes after the previous global optimization.

Embodiments of the invention provide a solution to online environment mapping by using a hybrid representation of a fully metric Euclidean environment map and a topological map of an input video sequence. The experiment results show that the proposed local adjustment can handle the topological changes of the input video sequence successfully. The topological changes are reflected in the optimization, where the loop closure creates additional constraints among keyframes.

With only local adjustment and location recognition, the resulting map is only locally metric. Severe misalignments may even prevent traditional bundle adjustment from converging to the right map. The proposed global adjustment overcomes the deficiencies of existing methods. For each iteration, the global adjustment segments the environment map into several keyframe segments, and individual segments are optimized locally. The global adjustment aligns the optimized segments jointly with all the landmarks.

While particular embodiments and applications of the invention have been illustrated and described herein, it is to be understood that the invention is not limited to the precise construction and components disclosed herein and that various modifications, changes, and variations may be made in the arrangement, operation, and details of the methods and apparatuses of the invention without departing from the spirit and scope of the invention as it is defined in the appended claims.

What is claimed is:

1. A computer implemented method for generating an environment map of an input video sequence, the method comprising:
    identifying a plurality of keyframes of the input video sequence and adding the identified keyframes into an initial environment map, the keyframes being identified based on video features associated with a plurality of video frames of the input video sequence, and the initial environment map being represented by a keyframe pose graph;
    enforcing local metric properties of a group of identified keyframes of the initial environment map;
    optimizing the initial environment map based on global metric properties of the identified keyframes, wherein optimizing the initial environment map comprises:
        clustering the identified keyframes into a plurality of disjoint sets of keyframes based on geodesic distance information of the keyframe pose graph, a disjoint set of keyframes representing a segment of keyframes;
        for each segment of keyframes, enforcing local metric properties of the keyframes in the segment;
        applying global segment optimization to the segments of keyframes, comprising:
            embedding the segments of keyframes and landmarks associated with the keyframes of the segments into a metric space; and
            updating projected three-dimensional coordinates of the landmarks to the associated keyframes based on the metric constraints of the landmarks and keyframes; and
    generating an output environment map based on the optimization.

2. The method of claim 1, further comprising:
    computing motion estimation of a camera system based on detected video features of the input video sequence;
    identifying a plurality of inlier features among the detected video features of the video sequence, wherein an inlier feature of the video sequence is modeled by a set of model parameters used to track the video features of the video sequence; and
    detecting loop closures of the initial environment map.

3. The method of claim 1, wherein the keyframe pose graph comprises:
    a plurality of nodes and a plurality of edges a pair of nodes of the plurality of nodes, a node of the graph representing a keyframe added to the initial environment map, and an edge between two nodes of the graph representing the relative pose between the two keyframes represented by the nodes.

4. The method of claim 1, wherein a keyframe of the input video sequence has one or more landmarks associated with the keyframe, and the association between the keyframe and a landmark is determined based on whether the landmark is observed by the keyframe.

5. The method of claim 4, wherein two keyframes observing a same landmark are linked, the linkage between the two keyframes is represented by an edge between the two keyframes in the keyframe pose graph.

6. The method of claim 1, wherein enforcing local metric properties of a group of identified keyframes of the initial environment map comprises:
    selecting the group of keyframes most recently added to the keyframe pose graph, the size of the group being predetermined; and
    applying sparse bundle adjustment to the group of the keyframes, wherein the sparse bundle adjustment refines a plurality of three-dimensional coordinates describing a scene geometry observed by the group of the keyframes subject to the local metric properties of the group of the keyframes.

7. The method of claim 1, further comprising:
    extracting one or more video features from the plurality of video frames of the input video sequence; and
    tracking the video features in two or more video frames of the input video sequence.

8. The method of claim 1, wherein applying global segment optimization further comprises:
    repeating the global segment optimization operations to segments of newly added keyframes and landmarks in the environment map.

9. A non-transitory computer-readable storage medium storing executable computer program code for generating an environment map of an input video sequence, the computer program code comprising instructions for:
    identifying a plurality of keyframes of the input video sequence and adding the identified keyframes into an initial environment map, the keyframes being identified based on video features associated with a plurality of video frames of the input video sequence, and the initial environment map being represented by a keyframe pose graph;
    enforcing local metric properties of a group of identified keyframes of the initial environment map;
    optimizing the initial environment map based on global metric properties of the identified keyframes, wherein optimizing the initial environment map comprises:
        clustering the identified keyframes into a plurality of disjoint sets of keyframes based on geodesic distance information of the keyframe pose graph, a disjoint set of keyframes representing a segment of keyframes;
        for each segment of keyframes, enforcing local metric properties of the keyframes in the segment;
        applying global segment optimization to the segments of keyframes, comprising:
            embedding the segments of keyframes and landmarks associated with the keyframes of the segments into a metric space; and
            updating projected three-dimensional coordinates of the landmarks to the associated keyframes based on the metric constraints of the landmarks and keyframes; and
    generating an output environment map based on the optimization.

10. The computer-readable storage medium of claim 9, further comprising computer program instructions for:
    computing motion estimation of a camera system based on detected video features of the input video sequence;
    identifying a plurality of inlier features among the detected video features of the video sequence, wherein an inlier feature of the video sequence is modeled by a set of model parameters used to track the video features of the video sequence; and
    detecting loop closures of the initial environment map.

11. The computer-readable storage medium of claim 9, wherein the keyframe pose graph comprises:
    a plurality of nodes and a plurality of edges a pair of nodes of the plurality of nodes, a node of the graph representing a keyframe added to the initial environment map, and an edge between two nodes of the graph representing the relative pose between the two keyframes represented by the nodes.

12. The computer-readable storage medium of claim 9, wherein a keyframe of the input video sequence has one or more landmarks associated with the keyframe, and the association between the keyframe and a landmark is determined based on whether the landmark is observed by the keyframe.

13. The computer-readable storage medium of claim 12, wherein two keyframes observing a same landmark are linked, the linkage between the two keyframes is represented by an edge between the two keyframes in the keyframe pose graph.

14. The computer-readable storage medium of claim 9, wherein the computer program instructions for enforcing local metric properties of a group of identified keyframes of the initial environment map comprise instructions for:
   selecting the group of keyframes most recently added to the keyframe pose graph, the size of the group being predetermined; and
   applying sparse bundle adjustment to the group of the keyframes, wherein the sparse bundle adjustment refines a plurality of three-dimensional coordinates describing a scene geometry observed by the group of the keyframes subject to the local metric properties of the group of the keyframes.

15. The computer-readable storage medium of claim 9, further comprising computer program instructions for:
   extracting one or more video features from the plurality of video frames of the input video sequence; and
   tracking the video features in two or more video frames of the input video sequence.

16. The computer-readable storage medium of claim 9, wherein the computer program instructions for applying global segment optimization further comprise instructions for:
   repeating the global segment optimization operations to segments of newly added keyframes and landmarks in the environment map.

17. A computer system for generating an environment map of an input video sequence, the system comprising:
   a location recognition module for identifying a plurality of keyframes of the input video sequence and adding the identified keyframes into an initial environment map, the keyframes being identified based on the video features associated with a plurality of video frames of the input video sequence, and the initial environment map being represented by a keyframe pose graph;
   a local adjustment module for enforcing local metric properties of a group of identified keyframes of the initial environment map; and
   a global adjustment module for:
   optimizing the initial environment map based on global metric properties of the identified keyframes, wherein optimizing the initial environment map comprises:
      clustering the identified keyframes into a plurality of disjoint sets of keyframes based on geodesic distance information of the keyframe pose graph, a disjoint set of keyframes representing a segment of keyframes;
      for each segment of keyframes, enforcing local metric properties of the keyframes in the segment;
      applying global segment optimization to the segments of keyframes, comprising:
         embedding the segments of keyframes and landmarks associated with the keyframes of the segments into a metric space; and
         updating projected three-dimensional coordinates of the landmarks to the associated keyframes based on the metric constraints of the landmarks and keyframes; and
   generating an output environment map based on the optimization.

18. The system of claim 17, wherein:
   a scene flow module is for:
      computing motion estimation of a camera system based on detected video features of the input video sequence;
      identifying a plurality of inlier features among the detected video features of the video sequence, wherein an inlier feature of the video sequence is modeled by a set of model parameters used to track the video features of the video sequence; and
   the location recognition module is further for detecting loop closures of the initial environment map.

* * * * *